United States Patent [19]

Spiller et al.

[11] Patent Number: 4,749,425
[45] Date of Patent: Jun. 7, 1988

[54] METHOD OF MAKING A DISK WHEEL, ESPECIALLY A RAILROAD WHEEL

[75] Inventors: Hans-Dieter Spiller, Burgrieden; Peter Wackerle, Ottobrunn, both of Fed. Rep. of Germany

[73] Assignee: Messerschmitt-Boelkow-Blohm GmbH, Munich, Fed. Rep. of Germany

[21] Appl. No.: 72,179

[22] Filed: Jul. 10, 1987

Related U.S. Application Data

[62] Division of Ser. No. 831,643, Feb. 20, 1986, Pat. No. 4,699,417.

[30] Foreign Application Priority Data

Feb. 21, 1985 [DE] Fed. Rep. of Germany ....... 3506007

[51] Int. Cl.⁴ .............................................. B32B 31/04
[52] U.S. Cl. ................................... 156/153; 156/293; 156/307.3; 156/307.7
[58] Field of Search .............. 156/293, 294, 194, 245, 156/172, 182, 307.3, 307.7, 307.1, 153; 295/7, 8, 21, 23, 30; 301/37 R, 37 P, 63 PW; 29/159 R, 159.01-159.03; 264/258, 257, 313, 314

[56] References Cited

U.S. PATENT DOCUMENTS

| | | | |
|---|---|---|---|
| 133,336 | 11/1872 | Prew | 295/21 |
| 302,203 | 7/1884 | Hoover | 295/21 |
| 368,262 | 8/1887 | Westervelt | 295/21 |
| 690,531 | 1/1902 | Smith | 295/21 |
| 4,571,005 | 2/1986 | Nowak et al. | 301/63 PW |

*Primary Examiner*—Jerome Massie
*Assistant Examiner*—D. Herb
*Attorney, Agent, or Firm*—W. G. Fasse; D. H. Kane, Jr.

[57] ABSTRACT

A disk wheel, especially a railroad wheel, has a composite construction of a single piece metal hub and a single piece metal rim connected to each other by a wheel disk of fiber reinforced composite material providing exclusively adhesive bonds. The wheel disk transmits shearing stress between hub and rim. The rim is provided with two radially inwardly extending rim flanges. The hub has two radially outwardly extending hub flanges. The shearing stress transmitting wheel disk (12) has a radially outer rim contacting surface (9) adhesively bonded to the rim (3) and rim flanges (7), and a radially inner hub contacting surface (8) adhesively bonded to the hub (2) and hub flanges (6). The wheel disk (12) is inserted into the space between the concentrically arranged hub and rim as long as the composite material is not yet cured and hence sufficiently deformable. The wheel disk is exposed to compression during curing. After the curing a cover disk is adhesively bonded to the rim, hub, and wheel disk on both sides of the wheel. Preferably, the wheel disk is made of a plurality of box type or shell type truncated sectors.

11 Claims, 3 Drawing Sheets

4,749,425

METHOD OF MAKING A DISK WHEEL, ESPECIALLY A RAILROAD WHEEL

This is a divisional of application Ser. No. 831,643, filed Feb. 20, 1986, now U.S. Pat. No. 4,699,417.

FIELD OF THE INVENTION

The invention relates to a disk wheel, especially to wheels for railroad vehicles. The invention also relates to a method for manufacturing such disk wheels having a hub and a rim connected to the hub by a shear transmitting wheel disk made of fiber composite material. A cover disk is adhesively bonded to the rim, to the hub, and to the wheel disk on each side of this type of wheel.

DESCRIPTION OF THE PRIOR ART

German Patent Publication (DE-OS) No. 3,119,500 discloses disk wheels of the type mentioned above, including, for example, railroad wheels or large diameter gear wheels having a compound construction of metal and fiber reinforced materials. With the aid of such a compound construction it is possible to reduce the weight of the disk wheels. Further, the fiber reinforced materials have an inherent structural noise damping characteristic so that the noise nuisance occurring during operation of such wheels is also reduced. Another feature of such compound construction is the possibility that the strength characteristics and the stiffness characteristics may be adapted to the forces occurring during the operation of the wheel in which these forces are effective in the radial direction, in the axial direction, and in the circumferential direction.

In the conventional disk wheel the different materials, namely fiber reinforced materials and steel, are interconnected with each other or with one another, for example, by bolts and nuts, by a shrink fit, or by an adhesive bonding.

The construction of the just described prior art disk wheel according to German Patent Publication (DE-OS) No. 3,119,500 has been further improved in the disk wheel as disclosed in U.S. Ser. No. 680,277, filed on Dec. 10, 1984, and now by U.S. Pat. No. 4,571,055, issued Feb. 18, 1986. The disk wheel according to U.S. Pat. No. 4,571,005 comprises two hub sections, each of which has a circumferential flange at its axially outer edge. Each flange is adhesively bonded to the respective cover disk in a multi-layer or three-ply fashion. The cover disks are adhesively bonded into recesses running laterally around the wheel rim. A shear transmitting body which is stiff against shearing stress is inserted between the hub and the rim. The shearing stress transmitting body is in turn adhesively bonded to the cover disks. Additionally, an adhesive bond is provided between the shearing stress transmitting body and a hub and between the shearing stress transmitting body and the wheel rim. The shearing stress transmitting body has, for example, a honeycomb structure made of a closed cell foam material. It is an advantage of this type of construction that only a few individual parts are necessary to assemble the wheel and these individual parts can be interconnected by an adhesive bond. The manufacturing costs of such disk wheels may thus be further reduced. Further, the requirements that such disk wheels have to satisfy with regard to their strength, their stability, and their quiet run can practically be satisfied to an optimal extent. However, there is still room for improvement, especially with regard to the adhesive bonding between the several components and with regard to the manufacture of the wheels.

OBJECTS OF THE INVENTION

In view of the foregoing it is the aim of the invention to achieve the following objects singly or in combination:

to construct a disk wheel of the type mentioned above in which the wheel components are solely interconnected by adhesive bonds;

to improve the bonding characteristics, especially by providing enlarged surface areas which participate in the adhesive bonding, whereby the wheel disk shall remain operationally safe even if one or several of the plurality of adhesive bonds should fail;

to provide a production method for making these disk wheels; and to utilize preimpregnated, fiber reinforced materials which have not yet been cured or hardened, for making such disk wheels and then curing the fiber reinforced resin materials.

SUMMARY OF THE INVENTION

It is an essential feature of the invention that the shear transmitting body is constructed as a stiff member having a meandering or Z-type cross-sectional configuration in a cylindrical plane extending coaxially with the rotational axis of the wheel. It is further a feature of the invention that such shear transmitting body is held in place by adhesive bonds between the two outer flanges of the hub and between the two outer flanges of the wheel rim, whereby the shear body is adhesively bonded in a groove formed around the hub by the hub flanges and in a groove facing inwardly along the wheel rim and formed by the rim flanges. Due to the mounting of the shear transmitting body in two grooves so to speak it is assured that the wheel remains safely operational even if the adhesive bonds between the shear body and the hub and rim should fail.

Tests have been made by simulation, whereby the adhesive bonds between the shear transmitting body and the hub on the one hand, and the wheel rim on the other hand, were omitted altogether. In the test sample the shear transmitting body was made by assembling a plurality of stiff, shell type truncated sectors all having the same configuration. The radially inwardly facing surfaces of the sectors were held in the groove around the hub. The radially outwardly facing surfaces of the sectors were held in the groove of the wheel rim. The radially extending side walls of the shell-type sectors contacted each other in a surface manner and in pairs, thus forming reinforced "spokes". The bottom walls of the shells faced alternately in opposite axial directions. Even the spoke forming pairs of radially extending side walls of the sectors were not bonded to each other. Further, cover disks were omitted in the test sample. Thus, the test simulated a situation which will hardly ever occur in practice, namely, that all adhesive bonds failed completely. It has been found that the inherently stiff sectors were held in the rim and flange grooves in such a rigid manner that the disk wheel could be brought to a standstill without any danger.

Thus, the construction of the present disk wheel is inherently safe provided that the truncated sheel type sectors forming the shear transmitting body have the required stiffness necessary for such an extreme situation in which all adhesive bonds should fail. In the test sample the required stiffness was obtained by using sectors having a wall thickness of about 6 mm, whereby the radially extending side walls of the sectors are located in radial planes passing through the rotational axis of the wheel. In other words, the rotational wheel axis is located in these planes.

It is advantageous if the hub and the wheel rim are constructed as single piece components or elements. In order to easily insert the shear transmitting body into the hub groove and into the rim groove, fiber reinforced materials or prepregs have been used which have not yet been cured. The not yet cured and hence not hardened shear transmitting body is inserted into the rim and hub grooves by being deformed accordingly. Thereafter, a suitable tool is used for bringing the preformed shear transmitting body into its final form. The tool comprises elastically deformable inserts for completely pressing the radially inner and radially outer walls of the shear transmitting body into the respective hub and rim groove, whereby these grooves form part of a mold which also comprises the elastically deformable inserts and pressure applying members. The groove surfaces along the hub and rim are prepared prior to the insertion, for the adhesive bonding. This preparation may, for example, be accomplished by inserting into these grooves an adhesive film which is prepared to provide an adhesive bond on both sides. However, it is substantially more economical to bond the shear transmitting body into the grooves by directly employing the matrix material of the fiber reinforced material as the bonding agent, whereby the bonding is accomplished as a result of the curing. To improve this type of bonding it is possible to roughen the groove surfaces, for example, by sand blasting and then coat the roughened surfaces with a bonding enhancing agent which reacts with the matrix material of the fiber reinforced material forming the shear transmitting body when the latter is pressed into these grooves as mentioned above.

In the embodiment in which the shear transmitting body is assembled from a plurality of shell type truncated sectors, the lateral or side walls of these sectors bond to each other as a result of the curing under pressure. Permitting the curing to take place under the influence of heat enhances the bonding. Such heat treatment or tempering may take place, for example, at a temperature of about 120° for a duration of about 30 minutes. During the cooling the compression is maintained on the shear transmitting body so that the curing takes place under pressure, whereby a rigid bonding is achieved between the shear transmitting body and the hub and between the shear transmitting body and the rim. If the shear transmitting body is made of several truncated sectors, the side walls are also bonded to each other at this time.

After the shear transmitting body has hardened and cured, cover disks are adhesively bonded to the axially outwardly facing edges of the rim and hub flanges forming the mentioned grooves, whereby these cover disks are also bonded to the surfaces of the bottom walls forming the shear transmitting body. As a result of this construction, a three ply layering is achieved at each rim flange and at each hub flange, namely, between the cover disks, the flange proper, and the shear transmitting body.

The quiet running characteristic of the present wheels may be increased by filling the hollow spaces in the shell type sectors with a noise absorbing or noise damping material, for example, blocks of closed cell foam material fitted into the spaces between the cover disks in the shear transmitting body. These closed cell foam material blocks are also adhesively bonded to the shear transmitting body and to the respective cover disk.

BRIEF DESCRIPTION OF THE DRAWINGS

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 1:
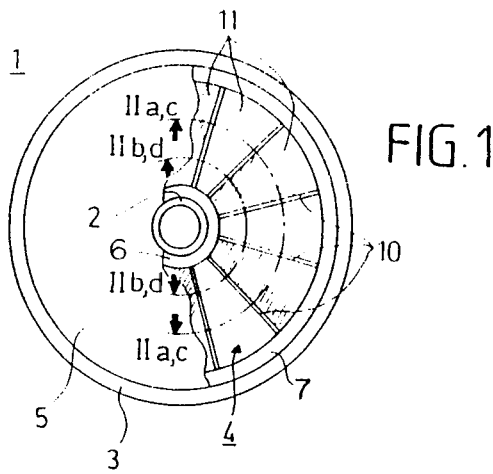
FIG. 1 is a simplified plan view of a disk wheel according to the invention, having a hub, a rim, and a shear transmitting body, whereby one of the cover disks is shown in a broken away fashion.
Figure 2:
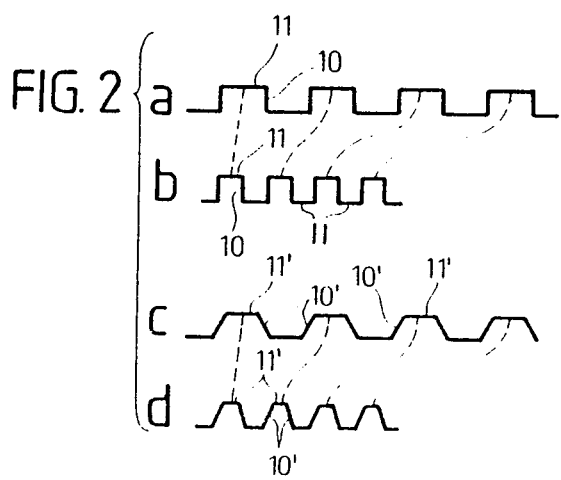
FIG. 2 shows four simplified sectional views through two different types of shear transmitting bodies along two cylindrical planes extending coaxially around the rotational axis of the wheel as shown in FIG. 1.
Figure 4:
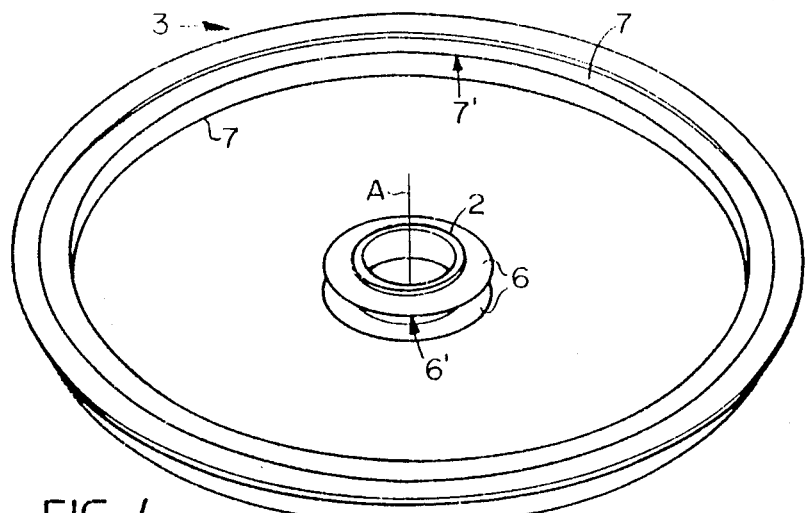
FIG. 4 shows the hub concentrically assembled within the wheel rim, whereby a mounting surface is not shown.
Figure 6:
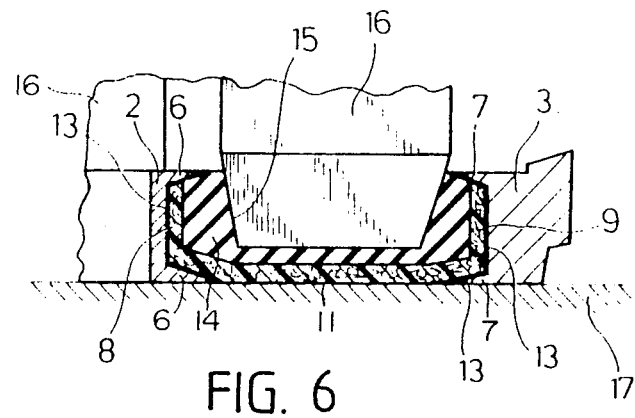
FIG. 6 is a sectional view along section line VI—VI in FIG. 5, and showing additionally the compression tools.

The railroad wheel 1 shown in FIG. 1 has a single piece hub 2 made of steel, a wheel rim 3 also made as a single piece steel member, a shear transmitting body 4 made of fiber reinforced material, and two cover disks 5, one of which is arranged on each side of the wheel. The cover disks 5 are also made of fiber reinforced material. Only the front cover disk 5 is shown partially broken away. The hub 2 is provided with two radially outwardly extending flanges 6 forming a radially outwardly open groove 6' as best seen in FIG. 2. The wheel rim 3 is provided with two radially inwardly pointing flanges 7 forming a radially inwardly open groove 7' as shown in FIG. 4. All flanges have a triangular cross-section as shown in FIG. 6, whereby the axially outwardly facing flange surfaces extend substantially radially relative to the central rotational axis 1 of the wheel while the axially inwardly facing surfaces of the flanges extend at an angle to the central axis A so that the side walls of both grooves 6' and 7' are slanted as best seen in FIG. 6. The arrangement is such, that the radially outwardly pointing edges of the flanges 6 point toward the radially inwardly reaching edges of the flanges 7 and vice versa.

Figure 3:
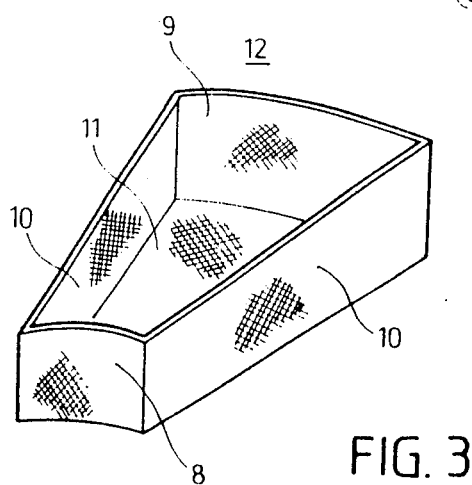
FIG. 3 is a perspective view of one truncated shell type box sector for forming the shear transmitting body.

The shear transmitting body 4 is made of a plurality of truncated shell type, box shaped sectors 12, one of which is shown in FIG. 3. Each sector has a radially outwardly facing wall 9, a radially inwardly facing wall 8, two side walls 10, and a bottom wall 11. The upwardly facing surface of each sector is open. The walls 8 are pressed into the groove 6' and the walls 9 are pressed into the grooves 7', whereby the side walls 10 of adjacent sectors 12 contact each other in radially extending planes passing through the rotational axis A. The walls 8 and 9 are securely held in the respective grooves 6', 7', whereby an axial movement of the shear transmitting body 4 is effectively prevented. The cover disks are adhesively bonded to the axially outwardly facing surfaces of the flanges 6 and 7. Additionally, the cover disks 5 are adhesively bonded to the respective axially facing bottom walls 11.

By placing the sectors 12 so that their open sides face alternately in opposite axial directions, a meandering type of cross-sectional configuration is obtained as shown at a, b, c, and d in FIG. 2. The cover disks 5 are omitted in FIG. 2. In a, b in FIG. 2, the cross-sectional configuration is a square wave, whereby the spacings between the side walls 10 of the same sector are larger at the larger radius (a) than at the small radius (b) and whereby the side walls 10 of neighboring sectors form spokes. In c and d in FIG. 2 the cross-section illustrates a shear transmitting body in which the side walls 10' extend at a slant as shown. Thus, in c and d in FIG. 2 the cross-sectional configuration approximates a truncated sinusoidal wave form, whereby the bottom walls 11' are somewhat smaller than in a and b in FIG. 2. In both instances the spacing between adjacent side walls 10 or 10' increases radially outwardly.

The truncated sector 12 shown in FIG. 3 is made of fiber reinforced materials by conventional steps. Optimal strength characteristics are achieved if the reinforcing fiber webbing comprises two thread systems arranged so that the threads in each system extend at a right angle relative to each other. Further, the threads in the side walls 10 and in the bottom 11 should extend at ±45° relative to the radial direction while the threads in the first and second walls 9 and 8 should extend at a ±45° angle relative to the circumferential direction. A simple way of manufacturing the sectors 12 involves pulling a webbing hose over a box type mold or frame and to then impregnate the hose with a resin bonding or matrix material as is known. Truncated sectors made as just described by pulling a hose type webbing over a box mold have walls which are slightly thicker than in the method described above to achieve the same strength. However, the slightly thicker walls are compensated by the substantially more economical type of production.

Figure 5:
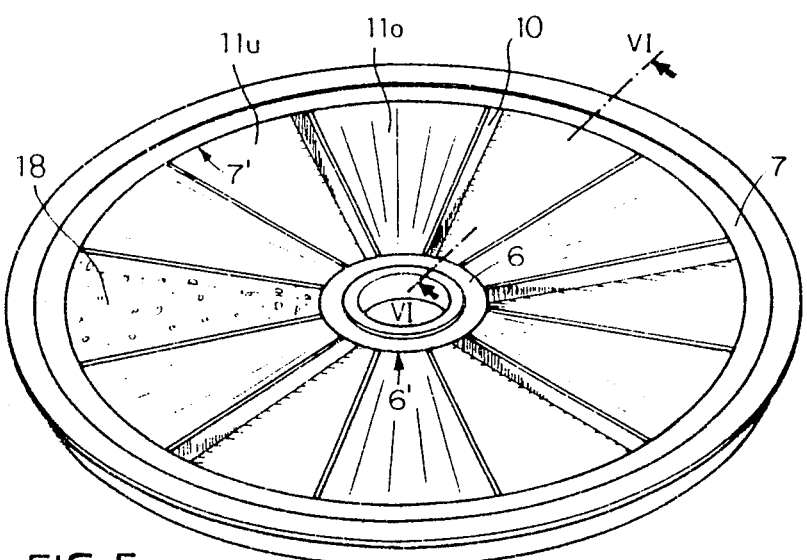
FIG. 5 illustrates a perspective view of a wheel after the; insertion of the truncated sectors forming the shear transmitting body.

A method for assembling the wheels will now be described with reference to FIGS. 4, 5, 6, and 7. First, a prefabricated hub 2 made as a single piece steel component and a rim 3 also made as a single piece steel component, are centered relative to each other on a work surface 17 shown in FIG. 6. The work surface may carry conventional jig members for properly centering the hub and rim relative to each other. For example, a central stud rigidly held on the work surface 17 may enter into the central bore of the hub 2 and three or more further studs also extending in fixed positions from the work surface 17 will locate the rim 3 centrally relative to the hub 2. Further, a plurality of flexibly deformable mold inserts corresponding to the mold inserts 14 shown in FIG. 6 and having rigid mold cores corresponding to the pressure applying members 16 shown in FIG. 6 will also be located on surface 17 between the hub and the rim substantially as shown in FIG. 6 when the latter is viewed upside down. The flexible mold inserts with their rigid cores also have a sector shape and are circumferentially spaced so that the box sectors 12 can be inserted with their open sides facing alternately downwardly toward the work surface 17 or upwardly away from the surface 17. Since the sectors are not yet cured it is possible to deform them into the respective hub groove 6' and rim groove 7' by the action of the elastically deforming mold inserts 14 in response to compression applied by the pressure application members 16 shown in FIG. 6. It is sufficient to apply pressure from one side only due to the above mentioned mold inserts and rigid cores. The truncated sectors are inserted so that there are no gaps between adjacent side walls 10 as shown in FIG. 5, whereby one set of bottom walls 11o faces upwardly, while another set of bottom walls 11u faces downwardly in alternate succession as best seen in FIG. 5. The number of flexibly deformable mold inserts 14 and the number of pressure applying members 16 correspond to the number of upwardly open box sectors 12. Similarly, the number of flexible mold inserts with their rigid central cores on the surface 17 also corresponds to the number of downwardly open box sectors 12.

It is recommended that the surfaces of the hub groove 6' and of the rim groove 7' are pretreated for enhancing the adhesive bond. Such enhancement may be accomplished by first inserting an adhesive film or by roughening the groove surfaces, for example, by sandblasting, and then by painting the roughened surfaces with a primer. An adhesive enhancing film or primer is shown at 13 in FIG. 6.

Once the wheel components and the elastically deforming mold inserts 14 have been assembled as described, pressure is applied with the aid of the members 16, the lower end of which has a configuration corresponding to the inner configuration 15 of the flexibly deformable mold insert 14, whereby the downwardly directed compression force causes the mold insert 14 to apply pressure substantially radially inwardly and radially outwardly for pushing the not yet cured fiber compound material of the walls 8 and 9 into the respective grooves 6'. and 7'. The slanting shown at 15 is important for this purpose.

While maintaining the pressure on the members 16, the assembly is heat treated, for example, for about 30 minutes at 120°. During this tempering of the truncated sectors 12, the resin bonding material is made more uniform throughout its volume and cross linking is enhanced for assuring a proper bonding at the respective interfaces between the walls of the sectors and the rim, and the hub, and the cover disks 5. The work surface 17 and the surfaces of the mold insert 14 are coated with an agent for prventing any bonding between the fiber reinforced synthetic material on the one hand and the surface 17 and the mold insert 14 on the other hand. A vegetable oil film would be suitable for this purpose.

The cover disks 5 are bonded to the axially outwardly facing surfaces of the flanges 6 and 7 and also to the outwardly facing surfaces of the walls 11. Here again, a film adhesive may be applied or the bonding may be achieved as a result of the curing.

Figure 7:
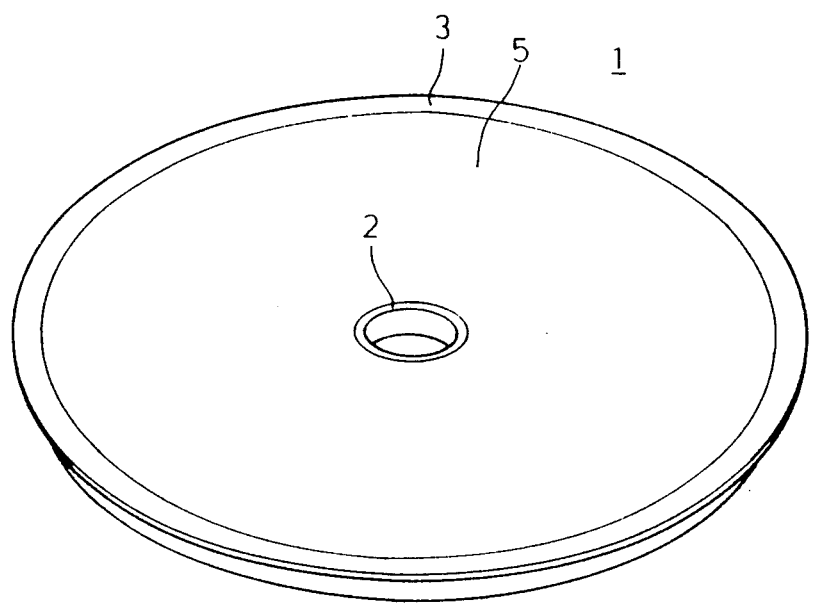
FIG. 7 shows a perspective view of a completed wheel according to the invention.

FIG. 7 shows the finished railroad wheel 1 in which the radial forces are primarily taken up by the side walls 10 and by the bottom walls 11 while axial forces, which may occur when the wheel negotiates a curve or passes through a track switch, are also taken up by the side walls 10 and additionally by the walls 8 and 9. Tangentially effective forces such as brake forces are taken up by the walls 8 and 9 and the bottom walls 11. A portion of the just mentioned forces is also taken up through the cover disks 5.

If desired, noise absorbing material 18 may be inserted into the hollow spaces of the sectors 12 as shown in FIG. 5. Close cell foam material has been found to be suitable for this purpose. The material 18 is adhesively bonded to the walls of the sectors 12 and to the cover disks 5.

Although the invention has been described with reference to specific example embodiments, it will be appreciated, that it is intended to cover all modifications and equivalents within the scope of the appended claims.

What we claim is:

1. A method for manufacturing disk wheels having a rotational central axis, a hub, a rim, a shear transmitting wheel disk interconnecting the hub and the rim, and a cover disk adhesively bonded to each side of the wheel, comprising the following steps:
   (a) providing a hub having two radially outwardly extending hub flanges forming an outwardly open hub groove, providing a rim having two radially inwardly extending rim flanges forming an inwardly open flange groove, locating said hub concentrically inside said rim,
   (b) forming said shear transmitting wheel disk of fiber composite material which is not yet cured, so as to have a meandering cross-sectional configuration in a cylindrical plane extending coaxially with said central axis, a first wall surface for contacting said rim, and a second wall surface for contacting said hub, said meandering configuration forming cavities,
   (c) inserting said meandering cross-sectional configuration of not yet cured fiber composite material into said rim groove and into said hub groove,
   (d) placing elastically deformable compression transmitting elements into said cavities of said meandering configuration on both sides of said meandering configuration,
   (e) applying compression to said elastically deformable elements for bringing said deformable elements into a final desired shape which causes an intimate bonding contact between said grooves and said first and second wall surfaces of said meandering configuration,
   (f) curing and hardening said shear transmitting wheel disk while said compression is being maintained for adhesively bonding said first and second wall surfaces in their respective groove to said rim and to said hub,
   (g) removing said compression and said elastically deformable elements, and
   (h) adhesively bonding said cover disks to said hub, to said rim and to said meandering shear transmitting wheel disk.

2. The method of claim 1, further comprising treating surfaces of said rim groove and of said hub groove for increasing the adhesive bond between said groove surfaces and said fiber composite material of said shear body.

3. The method of claim 2, wherein said treating comprises applying an adhesive film to said groove surfaces.

4. The method of claim 2, wherein said treating comprises roughening said groove surfaces, and coating the roughened groove surfaces with an adhesion enhancing primer.

5. The method of claim 1, wherein said forming of said wheel disk comprises making a plurality of box type shells having a truncated sector configuration including a bottom wall, two side walls, a first radially outer wall portion, a second radially inner wall portion, and an open side opposite said bottom wall, wherein said inserting step comprises assembling said plurality of box type shells so that said bottom walls face alternately in opposite directions, so that said side walls of neighboring shells contact each other for intimate bonding and so that said first wall portion can be pressed into the respective rim groove, and the second wall portion can be pressed into the respective hub groove, and then performing the remaining steps of claim 1.

6. The method of claim 5, further comprising treating surfaces of said rim groove and of said hub groove for increasing the adhesive bond between said groove surfaces and said fiber composite material of said shear body.

7. The method of claim 6, wherein said treating comprises applying an adhesive film to said groove surfaces.

8. The method of claim 6, wherein said treating comprises roughening said groove surfaces and coating the roughened groove surfaces with an adhesion enhancing primer.

9. The method of claim 1, wherein heat is applied to said shear body simultaneously with said compression for enhancing the curing and hardening.

10. The method of claim 9, wherein said heat application involves maintaining a substantially constant curing temperature for a time period sufficient for said curing.

11. The method of claim 10, wherein said temperature is about 120° C.

* * * * *